United States Patent Office 3,117,141
Patented Jan. 7, 1964

3,117,141
Δ¹ AND Δ¹,³-PREGNENES AND DERIVATIVES THEREOF
Alexander D. Cross, Mexico City, Mexico, assignor to Syntex Corporation, Panama, Panama, a corporation of Panama
No Drawing. Filed Oct. 19, 1962, Ser. No. 231,834
14 Claims. (Cl. 260—397.3)

The present invention relates to novel cyclopentanophenanthrene derivatives and to a process for the production thereof.

More particularly the present invention relates to novel Δ¹ and Δ¹,³-pregnane derivatives.

The novel compounds of the present invention are represented by the following formulae:

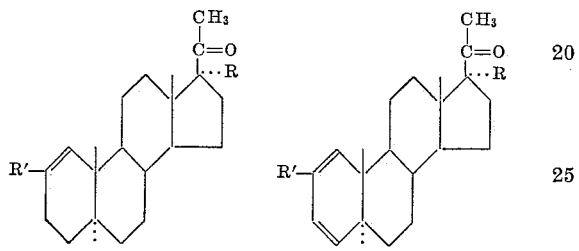

In the above formulae R represents hydrogen, hydroxyl or a hydrocarbon carboxylic acyloxy group of less than 12 carbon atoms; and $R^1$ represents hydrogen or methyl.

The acyloxy group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The novel compounds of the present invention are prepared by the process exemplified by the following reaction scheme:

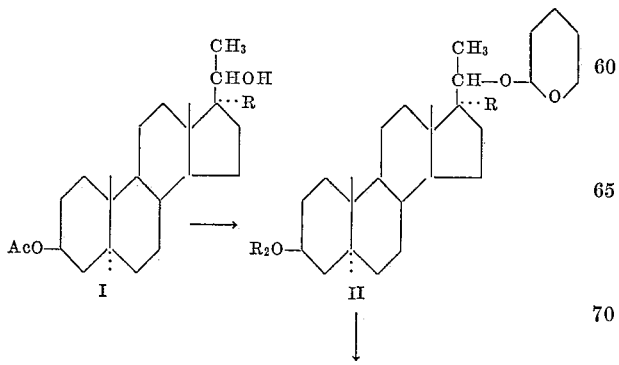

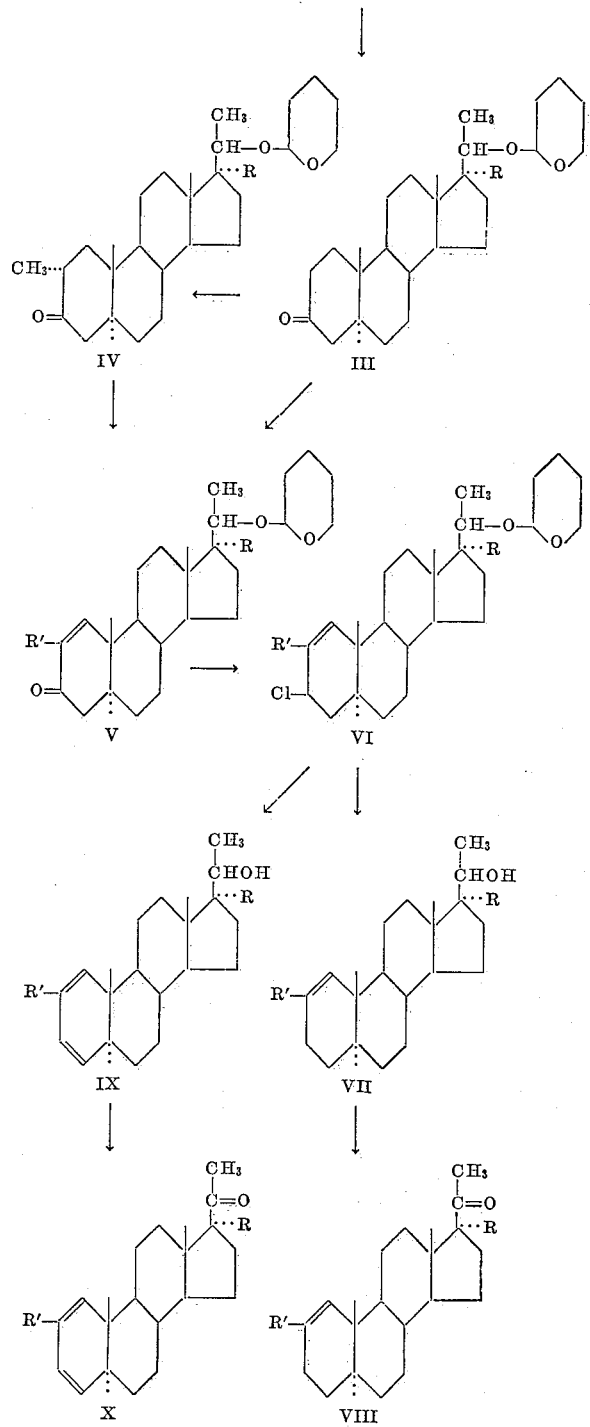

In the above formulae, R and $R^1$ have the same meaning as defined hereinbefore and $R^2$ represents hydrogen or a hydrocarbon carboxylic acyl group, preferably the acetyl group.

In practicing the process outlined above the starting compound is prepared by reducing the 3-acetate of allopregnan-3β-ol-20-one, or the 17α-acetoxy derivative thereof, preferably with sodium borohydride, in anhydrous solution, e.g. tetrahydrofuran, thus affording the 3-acetate or the corresponding allopregnane-3β,20β-diol (I), which upon treatment with dihydropyrane in the presence of the p-toluenesulfonic acid at room temperature, for a period of time of the order of four days, yields the 20-tetrahydropyranylether-3-acetate of the corresponding allopregnane-3β,20β-diol (II: R²=acetyl). The latter derivative is hydrolyzed conventionally in a basic medium, such as potassium carbonate with methanol to give the 20-tetrahydropyranylether of the corresponding allopregnane-3β,20β-diol compound (II: R²=H) which upon oxidation in a basic or neutral medium such as chromium trioxide in pyridine, yields the 20-tetrahydropyranylether of the corresponding allopregnan-20β-ol-3-one (III). Treatment of the latter with ethyl formate in the presence of sodium hydride yields the corresponding 2-hydroxymethylene derivative, which in turn is hydrogenated under conventional conditions, in the presence of 10% palladium on charcoal catalyst, to give the corresponding 20-tetrahydropyranylether of 2α-methyl-allopregnan-20β-ol-3-one (IV). The 20-tetrahydropyranylether of allopregnan-20β-ol-3-one, represented by Formula III or the corresponding 2α-methyl derivative thereof (IV), is brominated conventionally with approximately 1 molar equivalent of bromine in the presence of hydrogen bromide, to give the corresponding 2α-bromo derivative which upon conventional dehydrobromination, as for example with calcium carbonate in dimethylformamide, yields the 20-tetrahydropyranylether of the corresponding Δ¹-allopregnen-20β-ol-3-one or the 2-methyl derivative thereof (V). The latter compound (V) is reduced, preferably with lithium aluminum tri-t-butoxy hydride in tetrahydrofuran solution, at −75° C. for approximately 1 hour and at room temperature for about 30 minutes, thus affording the 20-tetrahydropyranylether of the corresponding Δ¹-allopregnene-3β,20β-diol which upon chlorination with a suitable agent, such as thionyl chloride, yields the 20-tetrahydropyranylether of the corresponding 3β-chloro-Δ¹-allopregnen-20β-ol (VI). The latter 3β-chloro compound is reduced with lithium aluminum hydride under conventional conditions to the corresponding 20-tetrahydropyranylether of 3-deschloro - Δ¹ - allopregnen - 20β-ol, which upon acid hydrolysis, e.g., with hydrochloric acid in acetone, affords the corresponding 20β-free alcohols (VII).

The 3β-chloro derivatives (VI) upon treatment with dimethylformamide-pyridine at reflux temperature for a period of time of the order of three hours yield the tetrahydropyranylether of the corresponding Δ¹,³-allopregnadien-20β-ol compounds which upon conventional acid treatment undergo hydrolysis of the ether group to the corresponding 20β-free alcohol (IX).

The 20β-hydroxy group of the compounds of the present invention (VII, IX), is oxidized, preferably with chromium trioxide in pyridine to give the corresponding 20-ketones (VIII, X).

The compounds of the present invention having in the molecule a tertiary hydroxyl group, e.g., at C-17, are conventially esterified in the presence of p-toluenesulfonic acid with an acylating agent, such as acetic anhydride, caproic anhydride, cyclopentylpropionic anhydride or enanthic anhydride, to produce the corresponding esters.

The following specific examples serve to illustrate, but are not intended to limit the scope of the present invention:

*Example I*

A solution of 2 g. of sodium borohydride in 30 cc. of methanol was added with stirring to a solution of 2 g. of the acetate of allopregnan-3β-ol-20-one in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave the 3-acetate of allopregnane-3β,20β-diol.

*Example II*

2 cc. of dihydropyrane were added to a solution of 1 g. of the latter compound in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 20-tetrahydropyranylether-3-acetate of allopregnane-3β,20β-diol.

*Example III*

A suspension of 1 g. of the last named derivative in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield the 20-tetrahydropyranylether of allopregnane-3β,20β-diol.

*Example IV*

A solution of 6 g. of the latter diol derivative in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded the 20-tetrahydropyranylether of allopregnan-20β-ol-3-one.

*Example V*

A solution of 5 g. of the 20-tetrahydropyranylether of allopregnan-20β-ol-3-one in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the former precipitate filtered, washed with water to neutral and dried under vacuum. Recrystallization from acetone-hexane yielded the 20-tetrahydropyranylether of 2α-bromo-allopregnan-20β-ol-3-one.

*Example VI*

2 g. of the latter 2α-bromo derivative in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded the 20-tetrahydropyranylether of Δ¹-allopregnen-20β-ol-3-one.

*Example VII*

A mixture of 5 g. of the 20-tetrahydropyranylether of allopregnan-20β-ol-3-one, in 40 cc. of anhydrous thiophene-free benzene 2 cc. of ethyl formate and 1.5 g. of sodium hydride was stirred for 8 hours under nitrogen. The sodium salt of the resulting 2-hydroxymethylene derivative and the excess hydride were filtered off, washed with benzene, then hexane and dried in vacuo. Cautious precipitation in excess ice-cold dilute hydrochloric acid gave the crude free 2-hydroxymethylene derivative which was filtered off, washed with water and air-dried. 1 g. of the product was hydrogenated for approximately 24 hours in 15 cc. of methanol over 0.4 g. of prehydrogenated 10% palladium charcoal catalyst at 25° C. and 570 mm. pressure until two moles of hydrogen were taken up. The mixture was filtered, the catalyst washed with hot methanol and the combined solutions evapoarted to dryness.

Crystallizataion from acetone-hexane yielded the 20-tetrahydropyranylether of 2α-methyl-allopregnan-20β-ol-3-one.

*Example VIII*

The latter compound was treated successively in accordance with Examples V and VI, giving respectively: the 20-tetrahydropyranylether of 2α-bromo-2β-methyl-allopregnan-20β-ol-3-one, and the 20-tetrahydropyranylether of 2-methyl-Δ¹-allopregnen-20β-ol-3-one.

*Example IX*

2 g. of the 20-tetrahydropyranylether of Δ¹-allopregnen-20β-ol-3-one, dissolved in 20 cc. of anhydrous tetrahydrofuran were cooled to −75° C. in a Dry Ice-acetone bath and treated with a previously cooled solution of 600 mg. of lithium aluminum tri-t-butoxy hydride in 20 cc. of anhydrous tetrahydrofuran. The reaction mixture was kept at −75° C. for 1 hour and then at room temperature for 30 minutes, poured into ice water water and extracted several times wih ethyl acetate, washed with water to neutral, dried over anhydrous sodium sulfate and evaporated to dryness under vacuum. After chromatography and recrystallization from acetone-hexane, there was obtained the 20-tetrahydropyranylether of Δ¹-allopregnene-3β,20β-diol.

A solution of 1 g. of the latter steroid in 50 cc. of anhydrous ether was treated with 1.5 cc. of purified thionyl chloride at 0° C. The reaction mixture was allowed to stand at the same temperature for 6 minutes, then it was washed with aqueous sodium bicarbonate solution, water, dried over anhydrous sodium sulfate and evaporated to dryness. Crystallization of the solid residue from ether-ethyl acetate yielded the 20-tetrahydropyranylether of 3β-chloro-Δ¹-allopregnen-20β-ol.

To a solution of 1 g. of the latter allylic chloride in 50 cc. of dimethyl formamide were added 2.2 mol equivalents of pyridine and the resulting mixture was refluxed for 3 hours. Thereafter it was cooled, poured into water and the obtained precipitate was filtered off, dried and recrystallized from acetone hexane, thus yielding the 20-tetrahydropyranylether of Δ¹,³-allopregnadien-20β-ol.

The 20-tetrahydropyranylether of 2-methyl-Δ¹-allopregnen-20β-ol-3-one was treated in accordance with the above procedures, thus affording successively: the 20-tetrahydropyanylether of 2-methyl-Δ¹-allopregnene-3β,20β-diol, the 20-tetrahydropyranylether of 3β-chloro-2-methyl-Δ¹-allopregnen-20β-ol and the 20-tetrahydropyranylether of 2-methyl-Δ¹,³-allopregnadien-20β-ol.

*Example X*

A solution of 1 g. of the 20-tetrahydropyranylether of 3β-chloro-Δ¹-allopregnen-20β-ol, in 50 cc. of ether was added over a 30 minutes period to a stirred suspension of 1 g. of lithium aluminum hydride in 50 cc. of anhydrous ether. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving the 20-tetrahydropyranylether of Δ¹-allopregnen-20β-ol.

Following the same procedure, there was treated: the 20-tetrahydropyanylether of 3β-chloro-2-methyl-Δ¹-allopregnen-20β-ol, to give the 20-tetrahydropyranylether of 2-methyl-Δ¹-allopregnen-20β-ol.

*Example XI*

A solution of 500 mg. of the 20-tetrahydropyranylether of Δ¹,³-allopregnadien-20β-ol in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave Δ¹,³-allopregnadien-20β-ol.

The starting compounds listed under A, were treated by the same procedure, thus affording the corresponding products set forth under B.

| A | B |
|---|---|
| The 20-tetrahydropyranylether of 2-methyl-Δ¹,³-allopregnadien-20β-ol. | 2-methyl-Δ¹,³-allopregnadien-20β-ol. |
| The 20-tetrahydropyranylether of 2-methyl-Δ¹-allopregnen-20β-ol. | 2-methyl-Δ¹-allopregnen-20β-ol. |
| The 20-tetrahydropyranylether of Δ¹-allopregnen-20β-ol. | Δ¹-allopregnen-20β-ol. |

*Example XII*

The final compounds of the preceding example were treated in accordance with Example IV, thus giving respectively: Δ¹,³-allopregnadien-20-one, 2-methyl-Δ¹,³-allopregnadien-20-one, 2-methyl-Δ¹-allopregnen-20-one, and Δ¹-allopregnen-20-one.

*Example XIII*

The diacetate of allopregnane-3β,17α-diol-20-one, obtained by conventional hydrogenation of 17α-hydroxy pregnenolone followed by conventional diacetylation, was successively treated in accordance with Examples I, II, III, IV, V, and VI, thus giving respectively: the 3,17-diacetate of allopregnane-3β,17α,20β-triol, the 20-tetrahydropyranylether 3,17-diacetate of allopregnane-3β,17α,20β-triol, the 20-tetrahydropyranylether-17-acetate of allopregnane-3β,17α,20β-triol, the 20-tetrahydropyranylether-17-acetate of allopregnane-17α,20β-diol-3-one, the 20-tetrahydropyranylether-17-acetate of 2α-bromo-allopregnane-17α,20β-diol-3-one, and the 20-tetrahydropyranylether-17-acetate of Δ¹-allopregnene-17α,20β-diol-3-one.

*Example XIV*

The 20-tetrahydropyranylether-17-acetate of allopregnane-17α,20β-diol-3-one was successively treated in accordance with the Examples VII, V, and VI, thus affording respectively: the 20-tetrahydropyranylether-17-acetate of 2α-methyl-allopregnane-17α,20β-diol-3-one, the 20-tetrahydropyranylether-17-acetate of 2α-bromo-2β-methyl-allopregnane-17α,20β-diol-3-one, and the 20-tetrahydropyranylether-17-acetate of 2-methyl-Δ¹-allopregnene-17α,20β-diol-3-one.

*Example XV*

The 20-tetrahydropyranylether-17-acetate of Δ¹-allopregnene-17α,20β-diol-3-one was treated following the procedures of Example IX, thus giving successively: the 20-tetrahydropyranylether of Δ¹-allopregnene-3β,17α,20β-triol, the 20-tetrahydropyranylether of 3β-chloro-Δ¹-allopregnene-17α,20β-diol, the 20-tetrahydropyranylether of Δ¹,³-allopregnadiene-17α,20β-diol.

*Example XVI*

The 20-tetrahydropyranylether-17-acetate of 2-methyl-Δ¹-allopregnene-17α,20β-diol-3-one, was treated in accordance with Example IX, thus consecutively: the 20-tetrahydropyranylether of 2-methyl-Δ¹-allopregnene-3β,17α,20β-triol, the 20-tetrahydropyranylether of 3β-chloro-2-methyl-Δ¹-allopregnene-17α,20β-diol, and the 20-tetrahydropyranylether of 2-methyl-Δ¹,³-allopregnadiene-17α,20β-diol.

*Example XVII*

Following the procedure of Example X, there were treated: the 20-tetrahydropyranylether of 3β-chloro-2-methyl-Δ¹-allopregnene-17α,20β-diol, and the 20-tetrahydropyranylether of 3β-chloro-Δ¹-allopregnene-17α,20β-diol to give the 20-tetrahydropyranylether of 2-methyl-Δ¹-allopregnene-17α,20β-diol, and the 20-tetrahydropyranylether of Δ¹-allopregnene-17α,20β-diol.

Example XVIII

The starting compounds listed under A were treated according to Example XI, thus affording the respective products set forth under B:

| A | B |
|---|---|
| The 20-tetrahydropyranylether of $\Delta^{1,3}$-allopregnadiene-17α,20β-diol. | $\Delta^{1,3}$-allopregnadiene-17α,20β-diol. |
| The 20-tetrahydropyranylether of 2-methyl-$\Delta^{1,3}$-allopregnadiene-17α,20β-diol. | 2-methyl-$\Delta^{1,3}$-allopregnadiene-17α,20β-diol. |
| The 20-tetrahydropyranylether of 2-methyl-$\Delta^1$-allopregnene-17α,20β-diol. | 2-methyl-$\Delta^1$-allopregnene-17α,20β-diol. |
| The 20-tetrahydropyranylether of $\Delta^1$-allopregnene-17α,20β-diol. | $\Delta^1$-allopregnene-17α,20β-diol. |

Example XIX

The final products of the preceding example were treated in accordance with Example IV, thus yielding respectively: $\Delta^{1,3}$-allopregnadien-17α-ol-20-one, 2-methyl-$\Delta^{1,3}$-allopregnadien-17α-ol-20-one, 2-methyl-$\Delta^1$-allopregnen-17α-ol-20-one, and $\Delta^1$-allopregnen-17α-ol-20-one.

Example XX

To a solution of 5 g. of $\Delta^1$-allopregnen-17α-ol-20-one in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced $\Delta^1$-allopregnen-17α-ol-20-one acetate.

Following the same procedure, there were treated $\Delta^{1,3}$-allopregnadien-17α-ol-20-one, 2-methyl-$\Delta^{1,3}$-allopregnadien-17α-ol-20-one, and 2-methyl-$\Delta^1$-allopregnen-17α-ol-20-one, thus giving respectively: $\Delta^{1,3}$-allopregnadien-17α-ol-20-one acetate, 2-methyl-$\Delta^{1,3}$-allopregnadien-17α-ol-20-one acetate, and 2-methyl-$\Delta^1$-allopregnen-17α-ol-20-one acetate.

Example XXI

The starting compounds of Example XX were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

I claim:

1. A compound of the following formula:

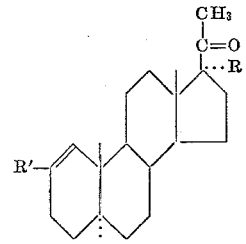

wherein R is selected from the group consisting of hydrogen, hydroxyl and a hydrocarbon carboxylic acyloxy group of less than twelve carbon atoms; and $R^1$ is selected from the group consisting of hydrogen and methyl.

2. 2-methyl-$\Delta^1$-allopregnen-20-one.
3. $\Delta^1$-allopregnen-20-one.
4. 2-methyl-$\Delta^1$-allopregnen-17α-ol-20-one.
5. $\Delta^1$-allopregnen-17α-ol-20-one.
6. 2-methyl-$\Delta^1$-allopregnen-17α-ol-20-one acetate.
7. $\Delta^1$-allopregnen-17α-ol-20-one acetate.
8. A compound of the following formula:

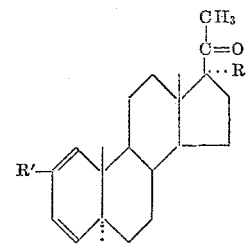

wherein R is selected from the group consisting of hydrogen, hydroxyl, and a hydrocarbon carboxylic acyloxy group of less than 12 carbon atoms; and $R^1$ is selected from the group consisting of hydrogen and methyl.

9. $\Delta^{1,3}$-allopregnadien-20-one.
10. 2-methyl-$\Delta^{1,3}$-allopregnadien-20-one.
11. $\Delta^{1,3}$-allopregnadien-17α-ol-20-one.
12. 2-methyl-$\Delta^{1,3}$-allopregnadien-17α-ol-20-one.
13. $\Delta^{1,3}$-allopregnadien-17α-ol-20-one acetate.
14. 2-methyl-$\Delta^{1,3}$-allopregnadien-17α-ol-20-one acetate.

No references cited.